United States Patent
Harper et al.

(10) Patent No.: US 11,970,663 B2
(45) Date of Patent: Apr. 30, 2024

(54) PRODUCTION OF FUEL PRODUCTS FROM WASTE RUBBER MATERIAL

(71) Applicant: YANCHEP TECHNOLOGY LIMITED, London (GB)

(72) Inventors: Robert David Harper, Cadiz (ES); Edward Allen Timpany, Hampshire (GB)

(73) Assignee: YANCHEP TECHNOLOGY LIMITED, London (GB)

( * ) Notice: Subject to any disclaimer, the term of this patent is extended or adjusted under 35 U.S.C. 154(b) by 4 days.

(21) Appl. No.: 17/263,519

(22) PCT Filed: Jul. 26, 2019

(86) PCT No.: PCT/EP2019/070266
§ 371 (c)(1),
(2) Date: Jan. 26, 2021

(87) PCT Pub. No.: WO2020/021104
PCT Pub. Date: Jan. 30, 2020

(65) Prior Publication Data
US 2021/0230486 A1     Jul. 29, 2021

(30) Foreign Application Priority Data
Jul. 26, 2018   (EP) ..................................... 18185720

(51) Int. Cl.
| C10G 1/10 | (2006.01) |
| C10G 1/00 | (2006.01) |
| C10G 31/08 | (2006.01) |

(52) U.S. Cl.
CPC .............. *C10G 1/10* (2013.01); *C10G 1/002* (2013.01); *C10G 31/08* (2013.01);
(Continued)

(58) Field of Classification Search
None
See application file for complete search history.

(56) References Cited

U.S. PATENT DOCUMENTS

| 4,994,168 A | 2/1991 | Harandi |
| 5,744,668 A | 4/1998 | Zhou et al. |

(Continued)

FOREIGN PATENT DOCUMENTS

| GB | 1604184 | 12/1981 |
| WO | 9014409 A1 | 11/1990 |
| WO | 2009065271 A1 | 5/2009 |

OTHER PUBLICATIONS

Exxonmobil "Marine Fuel Oil ISO 8217:2012" Retrieved from the Internet: URL:https://www.scribd.com/document/350883 689/Exxonmobil-Marine-Fuel-Oil, Jun. 10, 2017 [retrieved on Nov. 23, 2018].

(Continued)

*Primary Examiner* — Tam M Nguyen

(57) ABSTRACT

A process for extracting fuel products from waste rubber, comprising the steps of subjecting the waste rubber to pyrolysis to produce a pyrolysis vapour, subjecting the pyrolysis vapour to a condensation step to produce a pyrolytic oil having a boiling point range of 45-400° C. and a flash point below 25° C., and then subjecting the pyrolytic oil to a vacuum steam stripping step so as to recover a fraction having a first composition having a flash point above 55° C., a boiling point range starting at 140° C. or higher, a density at 15° C. of less than 990 kg/m³, a total acid number TAN of up to 12, a styrene content of less than 3000 ppm, and an organic halogen (as Cl) content of less than 50 ppm, and a second composition having an initial boiling point not exceeding 75° C. under atmospheric pressure, a density at 15° C. of greater than 790 kg/m³, a benzene content of at least 1.25 vol %, an existent gum (washed)

(Continued)

content greater than 10 mg/100 ml, an organic halogen (as Cl) content of less than 50 mg/kg, and a colour of less than 5.0.

8 Claims, 1 Drawing Sheet

(52) U.S. Cl.
CPC ............... *C10G 2300/1003* (2013.01); *C10G 2300/203* (2013.01); *C10G 2300/301* (2013.01); *C10G 2300/308* (2013.01); *C10G 2400/06* (2013.01)

(56) References Cited

U.S. PATENT DOCUMENTS

| | | |
|---|---|---|
| 2003/0114722 A1 | 6/2003 | Bradley |
| 2016/0304345 A1* | 10/2016 | Li .......................... B01D 53/04 |
| 2017/0166817 A1* | 6/2017 | Vasicek ................... C10B 53/07 |

OTHER PUBLICATIONS

Equilex Chemicals BV "PYGAS (Pyrolysis gasoline)" Retrieved from the Internet: URL:http://www.equilex.com/wp-content/uploads/2016/02/Pygas.pdf, Feb. 9, 2016 [retrieved on Aug. 19, 2019].

* cited by examiner

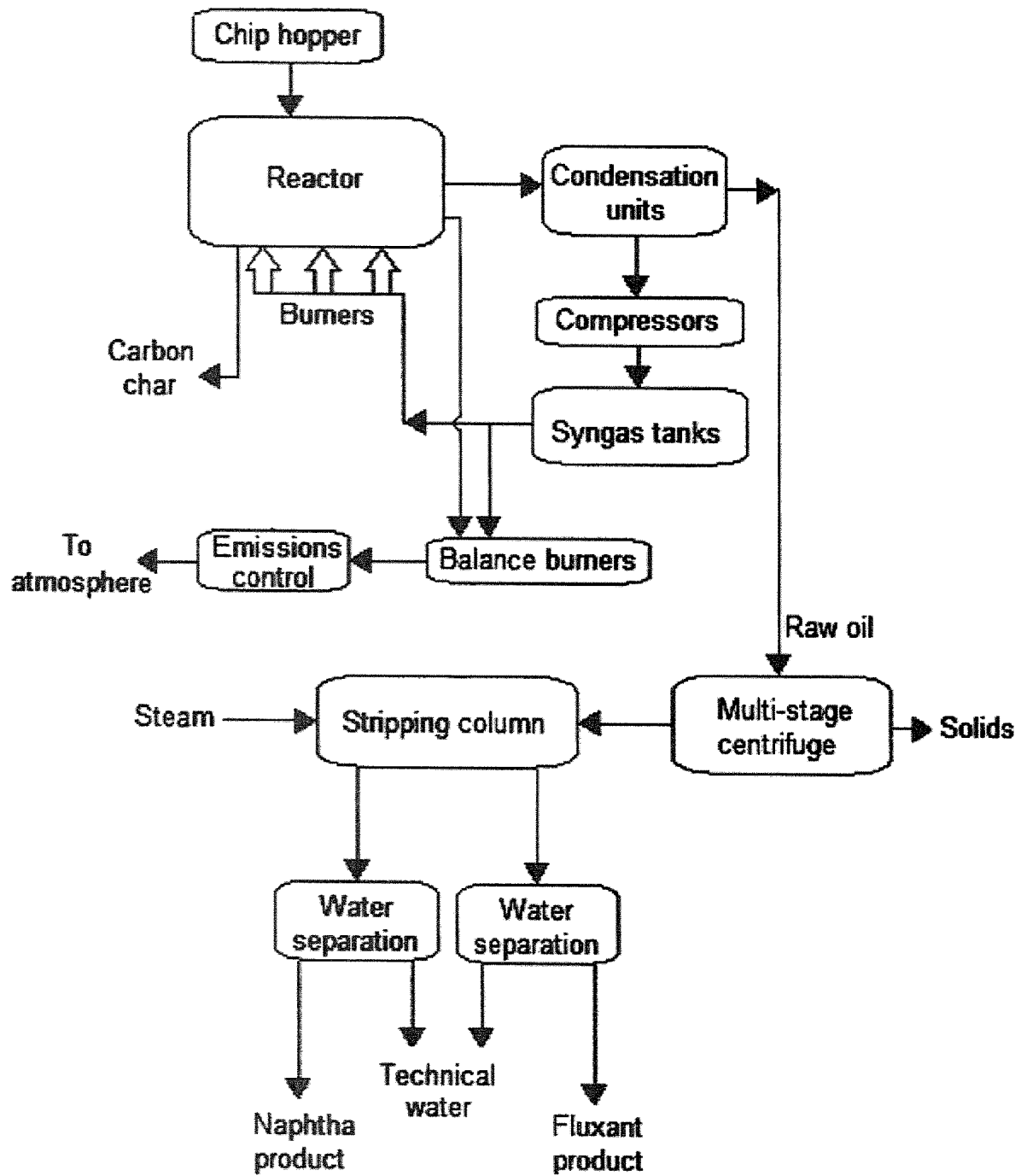

PRODUCTION OF FUEL PRODUCTS FROM WASTE RUBBER MATERIAL

The present invention relates to compositions obtained from the pyrolysis of waste rubber such as tyres, to fuel products comprising such compositions and also to a process comprising the pyrolysis of waste rubber and subsequent separation of the resulting oil to produce fuel products.

Many methods are known for preparing gasoline and diesel from waste carbonaceous material such as rubber and plastics. For example, U.S. Pat. No. 5,744,668 discloses a method for producing gasoline, diesel and carbon black from waste rubber and/or waste plastics which involves the sequential steps of pyrolysis, removal of residual sulphur nitrogen and chlorine, catalytic cracking and then fractionation of a portion of the catalytically cracked reaction product to separate gasoline, diesel and a heavy residue fraction. The heavy residue fraction is recycled into the pyrolysis step in this case, but ultimately a significant proportion will remain at the end of the process; furthermore the proportion of the residue fraction will be much greater in processes that do not run the (generally uneconomical) catalytic cracking step described in U.S. Pat. No. 5,744,668. WO 90/14409 discloses a method of extracting chemicals from tyre-derived pyrolytic oils which comprises subjecting the oils to a fractional distillation and recovering a fraction boiling in the range 43-204° C., and then subjecting this fraction to further fractional distillation in order to isolate and extract specific chemical products.

We have discovered that waste rubber products such as tyres can be treated so as to obtain products which have a particularly valuable combination of properties.

Accordingly in a first aspect the present invention provides a composition obtained from the pyrolysis of waste rubber and subsequent separation having:
 a flash point above 55° C. determined according to ASTM D93 procedure B,
 a boiling point range starting at 140° C. or higher under atmospheric pressure determined according to ASTM D86,
 a density at 15° C. of less than 990 kg/m$^3$ determined according to ASTM D4052,
 a total acid number (TAN) of up to 12 determined according to ASTM D664,
 a styrene content of less than 3000 ppm,
 and an organic halogen (as Cl) content of less than 50 mg/kg determined according to IP510.

The composition of this first aspect of the invention has a particular combination of features which allow its use as a fuel product, and in particular as a marine fuel component. Accordingly a further aspect of the invention comprises the use of the above composition as a fuel product, preferably a marine fuel component.

Due to the presence of the heavy black components, conventional rubber pyrolysis oils are black in colour. They also have a low flash point, which necessitates the use of storage and transportation equipment of a suitable low flash point class. However tanks, transporters and vessels that have the required safety status to carry low flash point class materials are generally dedicated to clear-coloured products, as the majority of products in the low flash point class are clear coloured. If a black product is placed in any receptacle designed for clear fuels, then an expensive cleaning process is required once the product is discharged, so as to avoid contamination of subsequently used clear products. As a result it is uneconomical to use a black product with a low flash point in the majority of tanks, transporters and vessels that service the petrochemical and industries. The marine fuels sector does have tanks, transporters and vessels which accept black coloured materials without the need for expensive post-use cleaning, but these generally do not comply with the onerous additional safety requirements for low flashpoint class fuels, and so are not generally capable of accepting low flashpoint class products.

A further particular feature of the composition of the first aspect of the invention is that its flash point is sufficiently high to permit it to be transported in the lower cost, high flashpoint class, black-colour compatible marine fuel storage and transportation infrastructure, whilst containing the very high boiling point black components from the original rubber pyrolysis. This produces the optimum economic output for the process, by incorporating the maximum possible mass of the rubber pyrolysis oil into the composition, whilst simultaneously significantly reducing the cost of storage and transportation of the product.

Another advantage of this composition is that its styrene content is sufficiently low to permit its use as a marine fuel: high levels of styrene are not permitted in marine fuels due to the risk of polymerisation, which can result in line blockages. Its Total Acid Number (TAN) is also low enough make it suitable for use as a marine fuel. Compositions which have high Total Acid Numbers can be corrosive which is undesirable in engines, and subsequent neutralisation can produce salts, which is undesirable in fuels due to the risk of sediment formation. A low level of halogen, particularly chlorine, is also important because chlorine is undesirable and strictly regulated in fuel products.

A further feature of the composition of this aspect of the invention is the low percent recovery level under the distillation conditions of ASTM D86. The composition preferably has a percent recovery of less than 90 vol % when subjected to a distillation test according to ASTM D86; more preferably the recovery is less than 80 vol %, and more preferably still it is less than 70 vol % and most preferably it is less than 60 vol %. Conventional diesel fuels typically have higher recovery levels, typically around 97 vol % or greater.

It is particularly surprising that it is possible to produce a fuel which is suitable for commercial use as a fuel and simultaneously satisfies all of the above requirements, whilst at the same time containing high levels of black products which are normally of little commercial value.

Although the composition is wholly obtained from the pyrolysis of waste rubber and subsequent separation, the invention includes within its scope compositions comprising blends in which at least 10%, preferably at least 20% of the blend is obtained from waste rubber and the remainder from fossil fuel sources.

Whether part of a blend or not, the composition of this aspect of the invention contains biogenic carbon, and preferably has a biogenic carbon content of at least 15%, more preferably at least 20%, most preferably at least 30% and particularly preferably at least 40%, as determined according to ASTM D6866 Method B (AMS). The biogenic carbon content is the percentage carbon from "renewable" (biomass or animal by-product) sources versus petroleum (or otherwise fossil) sources. For reference, 100% biogenic carbon indicates that a material is entirely sourced from plants or animal by-products and 0% biogenic carbon indicates that a material did not contain any carbon from plants or animal by-products: an intermediate value represents a mixture of natural and fossil sources of carbon.

As a result of it being derived from waste rubber, the composition of this aspect of the invention also contains aromatic hydrocarbons (organic compounds with benzenelike rings). Typically the total aromatic hydrocarbon content is at least 20% m/m, preferably at least 35% m/m and more preferably at least 50% m/m, as measured according to the IP391 test method.

The composition of this aspect of the invention may have a density at 15° C. of less than 980 kg/m³. Density is determined according to ASTM D4052.

The composition of the invention may have a boiling point range starting at 145° C. or higher under atmospheric pressure, and this may optionally be 150° C. or higher, 160° C. or higher or even 170° C. or higher.

The boiling point range of the composition of this aspect of the invention may start at a temperature not exceeding 250° C. under atmospheric pressure. Alternatively it may start at a temperature not exceeding 240° C., or 230° C., or 220° C., or 210° C., or 200° C., or 190° C., or even not exceeding 180° C.

The composition of this aspect of the invention preferably has a TAN no higher than 10, more preferably no higher than 8, and most preferably no higher than 7. TAN is determined according to ASTM D664.

The composition of this aspect of the invention preferably has a styrene content of less than 2500 ppm, more preferably less than 2000 ppm. Styrene content is determined by gas chromatography.

The composition of this aspect of the invention preferably has an organic halogen content (as Cl) below 40 mg/kg, more preferably below 30 mg/kg. Organic halogen content is determined according to IP510.

The process for producing the above composition, which process is discussed below, also produces a further composition. Accordingly a second aspect of the invention provides a composition obtained from the pyrolysis of waste rubber and subsequent separation of the resulting oil having:

an initial boiling point not exceeding 75° C. under atmospheric pressure determined according to ASTM D86,
a density at 15° C. of greater than 790 kg/m³ determined according to ASTM D4502,
a benzene content of at least 1.25 vol % determined according to ASTM D6839,
an existent gum (washed) content greater than 10 mg/100 ml determined according to ASTM D381,
an organic halogen (as Cl) content of less than 50 mg/kg determined according to IP510,
and a colour of no more than 5.0 determined according to ASTM D1500.

Like the composition of the first aspect of the invention, the composition of this second aspect of the invention also contains biogenic carbon, and preferably has a biogenic carbon content of at least 20%, preferably at least 30%, more preferably at least 40%, and most preferably at least 50%, as determined according to ASTM D6866 Method B (AMS).

The composition of this second aspect of the invention also contains aromatic hydrocarbons. Typically the total aromatic hydrocarbon content is at least 40% v/v, more preferably at least 45% v/v, as measured according to ASTM D6839-18.

The composition of this second aspect of the invention may have a density at 15° C. of greater than 800 kg/m³.

The composition of this second aspect of the invention may have an initial boiling point not exceeding 70° C. under atmospheric pressure.

The composition of this second aspect of the invention may have a benzene content of at least 1.5 vol %.

The composition of this second aspect of the invention may have an existent gum (washed) content greater than 30 mg/100 ml.

The composition of this second aspect of the invention may have a colour of no more than 3.0.

A further aspect of the invention comprises the use of the above composition of the second aspect of the invention as a fuel product.

As stated above, the compositions of both aspects of the present invention are obtained in the same process. Thus a further aspect of the invention provides a process for extracting fuel products from waste rubber, comprising the steps of:
(a) subjecting waste rubber to pyrolysis to produce a pyrolysis vapour;
(b) subjecting the pyrolysis vapour to a condensation step to produce a pyrolytic oil having a boiling point range of 45–400° C. and a flash point below 25° C., preferably below 18° C.;
(c) subjecting the pyrolytic oil to a vacuum steam stripping step at a pressure of less than 0.85 bar a and with a temperature of less than 140° C. at the top of the column, and recovering a first component having a boiling point range starting from 140° C. under atmospheric pressure or higher and possessing the properties defined above for the composition of the first aspect of the invention, and a second component having an initial boiling point not exceeding 75° C. under atmospheric pressure and possessing the properties defined above for the composition of the second aspect of the invention.

Preferably the waste rubber which is used in the process of the invention and from which the compositions of the invention are derived comprises waste tyres. These are usually chipped or shredded prior to use.

Regarding the pyrolysis step (a), such processes are well known in the art. A preferred process is operated at a temperature of 400-550° C., preferably 450-500° C. and more preferably 460-480° C. The process is preferably operated at a negative pressure relative to atmosphere of up to 0.1 bar, more preferably up to 0.02 bar. The residence time in the reactor is typically 1-4 hours, preferably 2-3 hours. Carbonaceous solids are evacuated from the base of the pyrolysis reactor, and the remaining pyrolysis product comprising gas and hydrocarbon vapour is passed onto the next condensation stage.

In the condensation stage (b) any suitable method may be used. In one preferred method, in a first stage the raw pyrolysis oil product is cooled, preferably to below 80° C., before being sprayed as an oil shower through a vertical condenser unit in which the hot pyrolysis gas and vapour products flow upwards through the descending oil shower. Oil condenses from the vapour stream, and the remaining vapour and gas is passed through a second condenser to condense the remaining oil. The condensed oil streams are combined to form a pyrolysis oil having a boiling point range of 45-400° C. and a flash point below 18° C., which may then be separated into the two compositions of the invention.

The pyrolytic oil typically contains 3-5% of suspended solid particles, which comprise principally carbon black. Prior to the separation stage, it is preferred that the solid level in the pyrolytic oil is reduced to no more than 0.2 wt %, preferably no more than 0.1 wt %. This is to reduce the risk of a stable Pickering emulsion forming around carbon particles during the subsequent separation stage. Techniques for removing suspended solids are well known in the art, and any process which is capable of reducing the solids to the required level may be used.

If it is required to reduce the level of suspended solids, they may be removed in one or more separate steps, with two or more steps being preferred. In a preferred solids removal stage, in a first step the pyrolytic oil is passed through a centrifuge to reduce the solids level to below 1.5 wt %, preferably below 1.2 wt %. The resultant stream is then subjected to a further solids removal step to reduce the solids level to no more than 0.5 wt %, and preferably no more than 0.2 wt %. The reason for the preferred use of two or more solids removal steps is that separators suitable for obtaining the very lowest levels of solids typically function most efficiently if the starting solids level is already low.

The separation step (c) utilises a vacuum steam stripping column: in this method, it is preferred that the pyrolytic oil contains no more than 0.2 wt % solids, and therefore it is preferred that prior to the separation step the pyrolytic oil has been subjected to a solids removal stage such as described above. In the vacuum steam stripping column, the pyrolytic oil flows down a packed vertical column and steam is pumped upwards. Oil and steam flowrates and the column pressure are adjusted to ensure that the correct components are separated. The column pressure is preferably less than 0.85 bar a, more preferably less than 0.5 bar a (where atmospheric pressure is defined as 1 bar a). The light component of the second aspect of the invention, which is usually referred to as the naphtha product, is carried away by the steam, both of which are condensed before being separated. The heavier component comprising the remaining liquid oil, which is the composition of the first aspect of the invention and is usually referred to as the fluxant product, is collected in a holding tank. The naphtha and fluxant products together comprise at least 98 vol %, preferably at least 99 vol % of the total product obtained from this vacuum steam stripping step (c).

The naphtha product (the composition of the second aspect of the invention) has utility in gasoline products.

The fluxant product (the composition of the first aspect of the invention) has a boiling point range starting at 140° C. or higher. The absence of any high temperature cut-off means that it contains large, complex hydrocarbon molecules and is typically black in colour.

A preferred embodiment of the invention is described below with reference to FIG. 1, which is a schematic view of this preferred embodiment of the process of the invention.

In this preferred embodiment of this invention, the waste rubber material used as a feedstock comprises waste tyres, which are first chipped to a size of no more than 40 mm×40 mm. The rubber feedstock may be pre-treated in any known manner to remove impurities.

The chipped rubber feedstock is fed from the chip hopper into a pyrolysis reactor via an airlock to prevent oxygen from entering the reactor vessel. The reactor is a horizontal round vessel with a slowly rotating shaft carrying paddles to move the rubber through the reactor. Burners provide heat to the reactor so as to control the temperature therein to about 470° C. The reactor operates at a slight negative pressure of −14 mb so as to prevent gas leakage. As the rubber passes through the reactor and is pyrolysed, the solid components form carbonaceous solids, which are evacuated from the reactor by means of an archimedes screw with an air lock on the exit purged with inert gas. The hydrocarbon gas and vapour is extracted from the reactor using the slight negative pressure, and transferred to the next condensation stage.

In the condensation stage the hot hydrocarbon gas and vapour flows upwardly through a vertical condenser unit containing packing, down through which is sprayed a shower of previously condensed crude pyrolytic oil which has been cooled to 70° C. The passage of the cooled oil through the packing causes about 90% of the vapour flowing upwards to condense. This condensed oil is passed through a water-to-oil heat exchanger where it is cooled to 70° C. From there it may either be recirculated into the condenser to form part of the oil shower, or transferred to a mixing tank for the next stage. The remaining vapour and gas exiting the condenser at 70° C. is passed through a second condenser to remove further condensables. In the second condenser the gas and vapour is bubbled through a chilled bath (15° C.) containing a lighter fraction of the condensed pyrolytic oil in order to further condense the vapour, as well as removing very light carbon particles. The remaining gas stream is then passed through a glycol heat exchanger (7° C.) to condense out any final liquid fractions. The dried gas which remains is condensed in syngas tanks, and is typically filtered and then used to fuel the burners heating the pyrolysis reactor, as shown in FIG. 1.

In this preferred embodiment of the invention, prior to separation the condensed pyrolytic oil is passed through a solids removal stage in order to reduce its solids content. The oil is first centrifuged through a decanter centrifuge to reduce the solids content to approximately 1 wt %, and then centrifuged further in a second step to reduce the solids content to below 0.2 wt %.

The filtered pyrolytic oil is then passed to a vacuum steam stripping column. The oil flows down the packed vertical column as an oil shower with steam flowing up the column. The temperature at the top of the column is maintained at less than 140° C. The column operates at below 0.85 bar a, preferably below 0.5 bar a and the oil and steam flowrates and pressure are adjusted to ensure that the lighter naphtha product (initial boiling point not exceeding 75° C. under atmospheric pressure) is carried away by the steam. This steam/naphtha stream is condensed in a heat exchanger, and the liquid naphtha phase then separated from the water. The second fluxant product boiling above 140° C. is collected in a holding tank.

EXAMPLE

A composition according to the invention was obtained by performing pyrolysis of a feedstock of chipped tyres followed by condensation, solids removal and vacuum steam stripping as described above. In this case the naphtha product collected had a boiling point range starting at 48.5° C. whilst the fluxant product had a boiling point range starting at 175° C.

The collected products were subjected to a distillation according to ASTM D86. The results are shown in the Table below, together with corresponding data for the pyrolysis oil before and after centrifugation, and for comparison a standard commercial automotive diesel product and a standard commercial marine gasoil product.

TABLE 1

Distillation test according to ASTM D86

|  |  | Oil pre-centrif. REC | Oil post-centrif. REC | Naphtha EVAP | Fluxant REC | Auto Diesel REC | Marine Gasoil REC |
|---|---|---|---|---|---|---|---|
| Initial boiling pt | °C. | 59.5 | 59.0 | 48.5 | 175.0 | 180.1 | 165.9 |
| 5% | °C. | 120.5 | 111.0 | 77.5 | 196.5 | 216.7 | 194.1 |
| 10% | °C. | 141.0 | 128.0 | 90.5 | 210.0 | 231.0 | 206.1 |
| 30% | °C. | 194.0 | 189.0 | 113.5 | 272.0 | 260.9 | 240.9 |
| 50% | °C. | 274.5 | 270.5 | 129.5 | 320.0 | 283.6 | 269.5 |
| 70% | °C. | 361.5 | — | 143.5 | — | 307.9 | 299.6 |
| 90% | °C. | — | — | 167.5 | — | 338.7 | 339.7 |
| 95% | °C. | — | — | 182.9 | — | 352.4 | 358.6 |
| Final boiling pt | °C. | 379.0 | 349.0 | 193.0 | 320.0 | 361.2 | 366.9 |
| Recovery | vol % | 76.0 | 69.0 | 98.2 | 50.0 | 97.8 | 97.3 |
| Residue | vol % | 23.0 | 30.0 | 1.2 | 49.0 | 1.4 | 1.4 |
| Loss | vol % | 1.0 | 1.0 | 0.6 | 1.0 | 0.8 | 1.3 |
| Density at 15° C. | kg/m³ | 939.0 | 924.6 | 820.1 | 962.3 | 838.6 | 833.2 |

REC = recovered
EVAP = evaporated
Density was determined according to ASTM D4052.

It can be seen that the fluxant product had a percent recovery of just 50 vol % in this test. By contrast the standard automotive and marine diesel products, which are middle distillates, had a percent recovery exceeding 97 vol %.

The recovered fluxant product (first aspect of the invention) was found to have the following properties:
Flash Point (ASTM D93B)—76° C.
TAN (ASTM D664)—4.61 mg KOHkg
Styrene content (gas chromatography method)—1086 ppm
Organic halogen as Cl (IP510)—13 mg/kg
Density at 15° C. (ASTM D4052)—962.3 kg/m³
Biogenic carbon content (ASTM D6866B)—50%
Total aromatic content (IP 391)—47.2 vol %

The recovered naphtha product (second aspect of the invention) was found to have the following additional properties:
Benzene content (ASTM D6839)—1.74 vol %
Existent gum (washed) content (ASTM D381)—50 mg/100 ml
Organic halogen as Cl (IP510)—9 mg/kg
Colour (ASTM D1500-12)—1.0
Biogenic carbon content (ASTM D6866B)—59%
Total aromatic content (ASTM D6839)—47.1 vol %

The above data shows that the fluxant product recovered has properties which permit its use as a component of marine fuels, as well as having a flash point high enough to permit its transportation without additional safety restrictions. Furthermore it makes use of high boiling point black components, which otherwise need to be further processed or disposed of separately, as they are regarded as being of little commercial value, since black colouration is incompatible with most transportation fuel products. The naphtha product recovered has properties which permit its use as a component in gasoline fuels.

The invention claimed is:

1. A composition obtained from a pyrolysis of waste rubber and subsequent separation of a resulting oil, the composition comprising:
   a flash point above 55° C. determined according to ASTM D93 procedure B,
   a boiling point range starting at 140° C. or higher under atmospheric pressure determined according to ASTM D86,
   a density at 15° C. of less than 990 kg/m³ determined according to ASTM D4052,
   a total acid number (TAN) of up to 12 determined according to ASTM D664,
   a styrene content of less than 3000 ppm determined according to gas chromatography,
   an organic halogen (as Cl) content of less than 50 mg/kg determined according to IP510, and
   a biogenic carbon content of at least 15%, as determined according to ASTM D6866 Method B (AMS),
   wherein the waste rubber from which the composition is derived comprises waste tyres.

2. The composition according to claim 1 further comprising aromatic hydrocarbons as measured according to IP391.

3. The composition according to claim 1, having a boiling point range starting at 145° C. or higher.

4. The composition according to claim 1, having a boiling point range starting no higher than 250° C.

5. A composition obtained from a pyrolysis of waste rubber and subsequent separation of a resulting oil, the composition comprising:
   an initial boiling point not exceeding 75° C. under atmospheric pressure determined according to ASTM D86,
   a density at 15° C. of greater than 790 kg/m³ determined according to ASTM D4502,
   a benzene content of at least 1.25 vol % determined according to ASTM D6839,
   an existent gum (washed) content greater than 10 mg/100 ml determined according to ASTM D381,
   an organic halogen (as Cl) content of less than 50 mg/kg determined according to IP510,
   a colour of no more than 5.0 determined according to ASTM D1500, and
   a biogenic carbon content of at least 20%, as determined according to ASTM D6866 Method B (AMS),
   wherein the waste rubber from which the composition is derived comprises waste tyres.

6. The composition according to claim 5 further comprising aromatic hydrocarbons as measured according to ASTM D6839.

7. The composition according to claim 2 which contains a total aromatic hydrocarbon content of at least 20% m/m, as measured according to IP391.

8. The composition according to claim 6 which contains a total aromatic hydrocarbon content of at least 40% m/m, as measured according to ASTM D6839.

* * * * *